US012712201B2

(12) United States Patent
Kim et al.

(10) Patent No.: US 12,712,201 B2
(45) Date of Patent: Aug. 18, 2026

(54) SOLID ELECTROLYTE AND ALL-SOLID-STATE BATTERY INCLUDING THE SAME

(71) Applicant: SAMSUNG ELECTRO-MECHANICS CO., LTD., Suwon-si (KR)

(72) Inventors: Kyunglock Kim, Suwon-si (KR); Youngjin Hwang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 642 days.

(21) Appl. No.: 18/026,667

(22) PCT Filed: Dec. 1, 2022

(86) PCT No.: PCT/KR2022/019339
§ 371 (c)(1),
(2) Date: Mar. 16, 2023

(87) PCT Pub. No.: WO2023/101459
PCT Pub. Date: Jun. 8, 2023

(65) Prior Publication Data
US 2024/0291023 A1 Aug. 29, 2024

(30) Foreign Application Priority Data

Dec. 2, 2021 (KR) ........................ 10-2021-0170735
Nov. 14, 2022 (KR) ........................ 10-2022-0151209

(51) Int. Cl.
*H01M 10/0562* (2010.01)
*C01B 25/45* (2006.01)

(52) U.S. Cl.
CPC ......... *H01M 10/0562* (2013.01); *C01B 25/45* (2013.01); *C01P 2002/72* (2013.01);
(Continued)

(58) Field of Classification Search
CPC ........... H01M 10/0562; H01M 10/052; H01M 10/0585; H01M 2300/0071;
(Continued)

(56) References Cited

U.S. PATENT DOCUMENTS

2012/0237834 A1 9/2012 Ogasa
2019/0177207 A1* 6/2019 Ishioka .................... H01G 4/30
(Continued)

FOREIGN PATENT DOCUMENTS

JP 2014-017137 A 1/2014
JP 2019-077591 A 5/2019
(Continued)

OTHER PUBLICATIONS

"Room temperature synthesis and phase transformation of lithium phosphate Li3PO4 as solid electrolyte", Ishigaki, et al, Jour Of Asian Ceramic Societies, 2021, vol. 9, No. 2, 452-458 (Year: 2021).*
(Continued)

*Primary Examiner* — Aiqun Li
(74) *Attorney, Agent, or Firm* — Morgan, Lewis & Bockius LLP

(57) ABSTRACT

The present disclosure relates to a solid electrolyte and an all-solid-state battery including the same. Specifically, provided are an oxide of a specific component system as a solid electrolyte (first solid electrolyte) and a solid electrolyte (second solid electrolyte) further including an oxide or salt of another component system as a second component while including the oxide of the specific component system as a first component.

8 Claims, 7 Drawing Sheets

(52) U.S. Cl.
CPC ...... *C01P 2004/03* (2013.01); *C01P 2004/04* (2013.01); *C01P 2006/40* (2013.01); *H01M 2300/0071* (2013.01)

(58) Field of Classification Search
CPC ........... H01M 2300/0068; C01B 25/45; Y02E 60/10; C01P 2002/72; C01P 2004/03; C01P 2004/04; C01P 2006/40
See application file for complete search history.

(56) References Cited

U.S. PATENT DOCUMENTS

| | | | | |
|---|---|---|---|---|
| 2019/0393505 | A1 | 12/2019 | Suzuki et al. | |
| 2020/0035061 | A1 | 1/2020 | Froy | |
| 2020/0381772 | A1 | 12/2020 | Kim et al. | |
| 2021/0167418 | A1 | 6/2021 | Kim et al. | |
| 2021/0184248 | A1 | 6/2021 | Ono | |
| 2021/0305622 | A1* | 9/2021 | Homma | H01M 10/052 |

FOREIGN PATENT DOCUMENTS

| | | | |
|---|---|---|---|
| KR | 10-2017-0008539 | A | 1/2017 |
| KR | 10-2019-0014174 | A | 2/2019 |
| KR | 10-1952196 | B1 | 2/2019 |
| KR | 10-2021-0066236 | A | 6/2021 |
| WO | 2018/179580 | A1 | 10/2018 |

OTHER PUBLICATIONS

International Search Report dated Mar. 10, 2023 issued in International Patent Application No. PCT/KR2022/019339.

* cited by examiner (a)
(b)
Li+
Replacement of NBOs with Cl atom
Si
O
B
Li
P
Li
Cl

[Fig. 2]
121
122
123
124
125
131, 132
140

Example 8
Example 1

[Fig. 6]
XRD
INTENSITY
80000
70000
60000
50000
40000
30000
20000
10000
0
$Li_3PO_4$ (Crystalline)
Halo(Amorphous)
10
20
30
40
50
60
2 THETA

[Fig. 7]
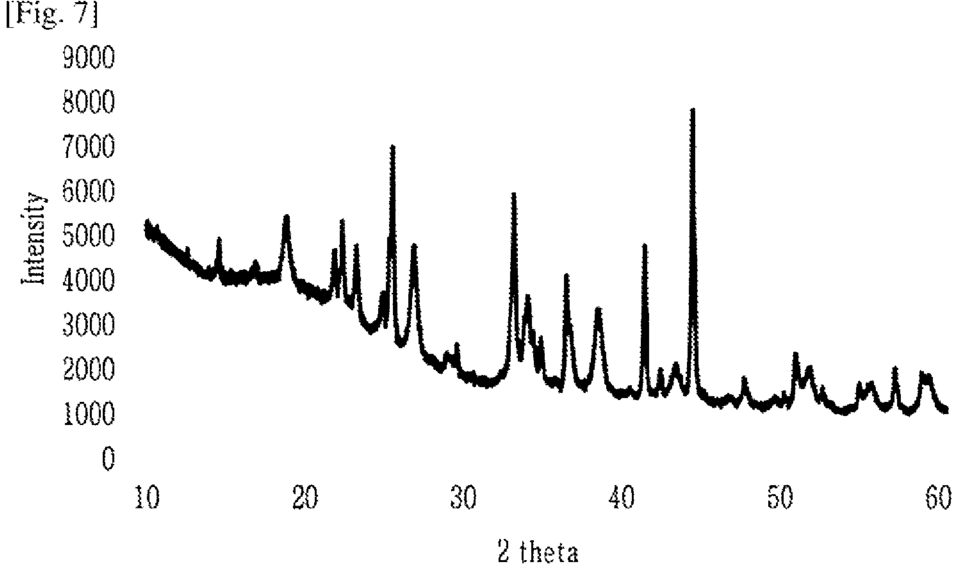
[Fig. 8]
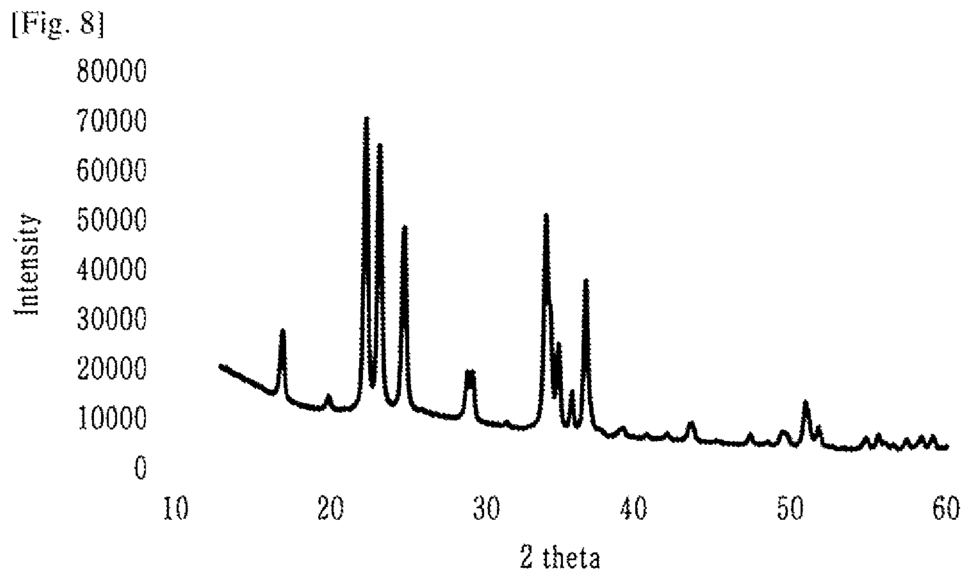
[Fig. 9]
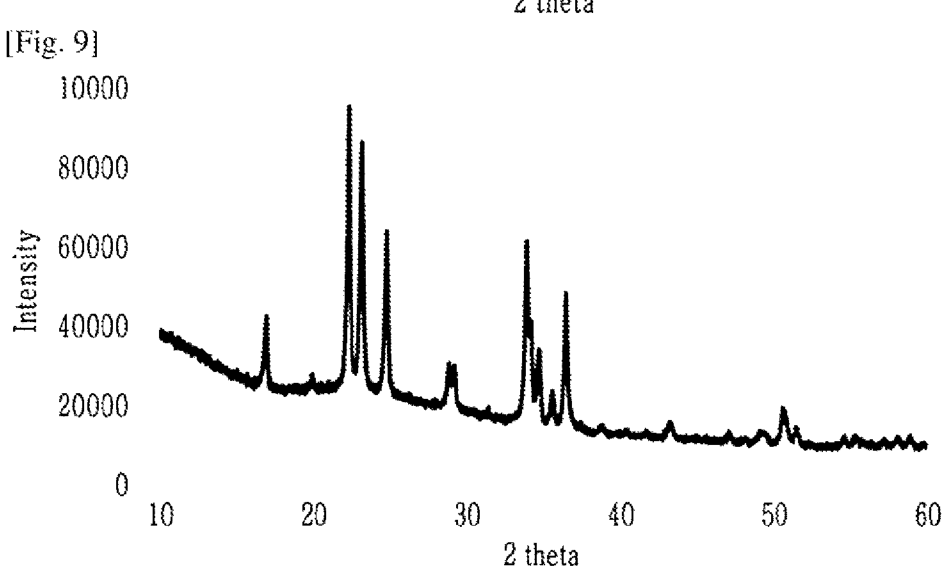

[Fig. 10]
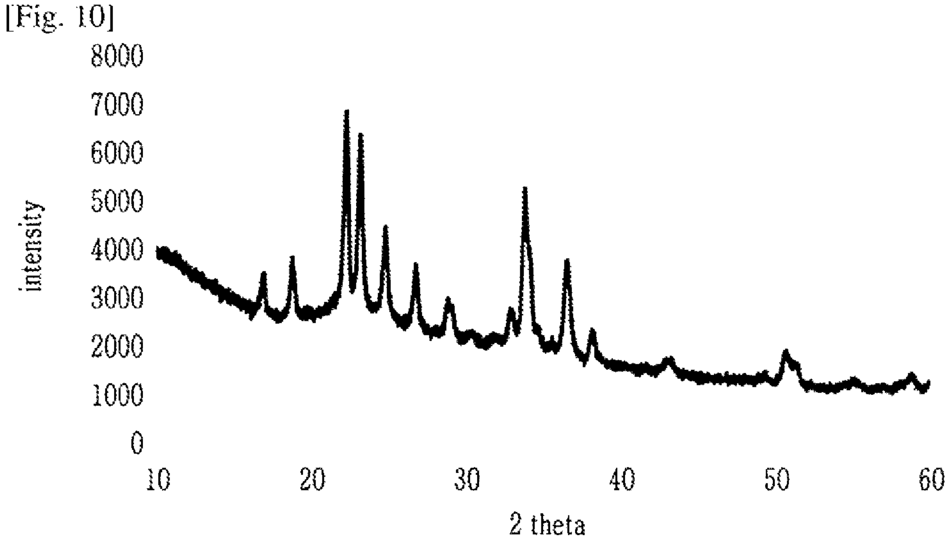
[Fig. 11]

[Fig. 12]
[Fig. 13]
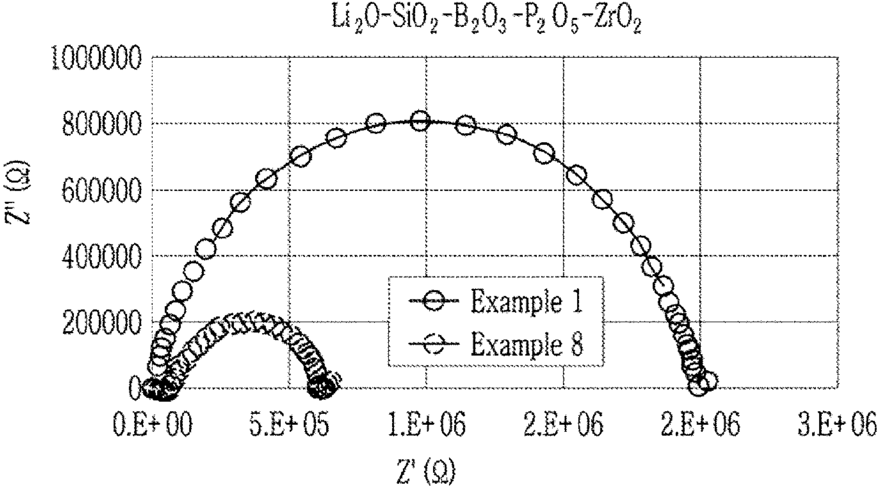
[Fig. 14]
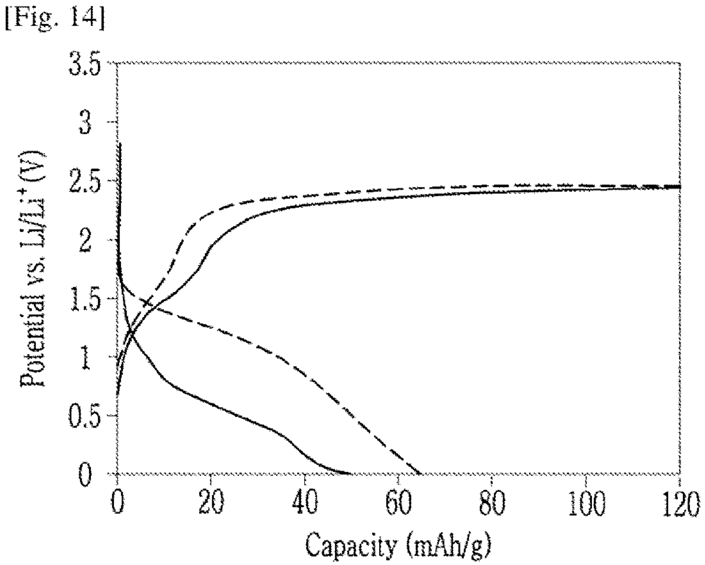

SOLID ELECTROLYTE AND ALL-SOLID-STATE BATTERY INCLUDING THE SAME

CROSS-REFERENCE OF RELATED APPLICATIONS

This application is the U.S. National Phase under 35 U.S.C. § 371 of International Patent Application No. PCT/KR2022/019339, filed on Dec. 1, 2022, which in turn claims the benefit of Korean Application Nos. 10-2021-0170735, filed on Dec. 2, 2021 and 10-2022-0151209, filed on Nov. 14, 2022, the entire disclosures of which applications are incorporated by reference herein.

TECHNICAL FIELD

The present disclosure relates to a solid electrolyte and an all-solid-state battery including the same.

BACKGROUND ART

A rechargeable lithium battery is widely used as a power source for driving a small electronic device such as a mobile phone, a laptop, a smart phone, and the like, and more expansively applied as a power source for driving an electric vehicle and storing power for an energy storage device and the like.

The most common type of the rechargeable lithium battery is a lithium ion battery, which uses a liquid electrolyte and thus has a problem (e.g., potential danger of leakage, ignition, explosion, and the like).

Recently, as a next-generation battery that solves the problems of the lithium ion battery, an "all-solid-state battery" in which the liquid electrolyte is replaced with a solid electrolyte is in the spotlight. However, the solid electrolyte has lower ionic conductivity than the liquid electrolyte and thus has a problem of interfacial resistance to ion movements between electrodes and electrolytes. Accordingly, for industrial mass production of the all-solid-state battery, the ionic conductivity of the solid electrolyte and the interfacial resistance to ion movements between electrode and electrolyte need to be reduced.

On the other hand, when the all-solid-state battery is manufactured to have a microchip shape, the all-solid-state battery basically has battery characteristics and also, may be used with IT parts such as MLCC, power inductor parts, and the like based on a size and a shape thereof. In the microchip-type all-solid-state battery, it is advantageous to use an oxide-based solid electrolyte rather than a sulfide-based solid electrolyte or a polymer-based solid electrolyte from the viewpoints of eco-friendliness, product performance, and mass production. However, the oxide-based solid electrolyte, which is generally-known, has an amorphous glass structure and thus may be thermally expanded or easily broken during a co-firing process for manufacturing the microchip-type all-solid-state battery.

DISCLOSURE OF INVENTION

Technical Problem

An embodiment provides an oxide of a specific component system as a solid electrolyte (first solid electrolyte) capable of increasing ionic conductivity, lowering interfacial resistance between an electrode and an electrolyte, suppressing thermal expansion, and enhancing strength.

Another embodiment provides a solid electrolyte (second solid electrolyte) having further improved ionic conductivity by further including an oxide of the specific component system as a first component and an oxide or salt of another component system as a second component at the same time.

Another embodiment provides an all-solid-state battery including the solid electrolyte of any one of the solid electrolyte according to the first embodiment and the solid electrolyte according to the second embodiment.

Solution to Problem

An embodiment provides a first solid electrolyte.

The first solid electrolyte may be an oxide including Li, Si, B, Zr, and P.

Based on 100 mol % of the total amount of Li, Si, B, Zr, and P in the first solid electrolyte, Li may be included in an amount of greater than or equal to about 40 mol % and less than or equal to about 80 mol %, Si may be included in an amount of greater than about 0 mol % and less than or equal to about 30 mol %, B may be included in an amount of greater than about 0 mol % and less than or equal to about 60 mol %, Zr may be included in an amount of greater than about 0 mol % and less than or equal to about 50 mol %, and P may be included in an amount of greater than about 0 mol % and less than or equal to about 60 mol %.

A mole fraction of Li/(Si+B+Zr) in the first solid electrolyte may be about 0.5 to about 5.

The first solid electrolyte may be represented by Chemical Formula 1:

$$a(Li_2O)\cdot b(SiO_2)\cdot c(B_2O_3)\cdot d(P_2O_5)\cdot e(ZrO_2) \quad \text{[Chemical Formula 1]}$$

wherein, in Chemical Formula 1, a to e are real numbers representing mole fractions, $40\leq a\leq 60$, $0<b\leq 30$, $0<c\leq 60$, $0<d\leq 60$, and $0<e\leq 50$.

a, b, c, d, and e may satisfy a+b+c+d+e=100.

A softening point of the first solid electrolyte may be greater than or equal to about 500° C. and less than or equal to about 550° C.

The first solid electrolyte may be glass or glass ceramic.

The first solid electrolyte may be glass ceramic, and a crystal phase due to $Li_3PO_4$ in X-ray diffraction (XRD) analysis using Cu-Kα may appear, and specifically a $Li_3PO_4$ crystal phase having a size of greater than or equal to about 1 nm and less than or equal to about 10 nm may exist in the amorphous structure.

The first solid electrolyte may have an ionic conductivity of greater than or equal to about $1.0\times10^{-8}$ S/cm.

Another embodiment provides a second solid electrolyte.

The second solid electrolyte may include an oxide including Li, Si, B, Zr, and P; and may further include, as the second component, an oxide or a salt including at least one element of Li, Al, Na, Mg, K, Ca, Ti, V, Cr, Mn, Fe, Co, Ni, Cu, Zn, Ga, Se, Rb, S, Y, Nb, Mo, Ag, In, Sn, Sb, Cs, Ba, Hf, Ta, W, Pb, Bi, Au, La, Nd, Eu, I, Cl, Br, or F.

A mole fraction of Li/(Si+B+Zr) in the second solid electrolyte may be about 0.5 to about 5.

The second solid electrolyte may be represented by Chemical Formula 2:

$$a(Li_2O)\cdot b(SiO_2)\cdot c(B_2O_3)\cdot d(P_2O_5)\cdot e(ZrO_2)\cdot f(X_mY_n) \quad \text{[Chemical Formula 2]}$$

wherein, in Chemical Formula 2, a to f are real numbers representing mole fractions, $40\leq a\leq 60$, $0<b\leq 30$, $0<c\leq 60$, $0<d\leq 60$, $0<e\leq 50$, $0\leq f\leq 50$; X is Li, Al, or a combination thereof; Y is Cl, O, or a combination thereof; $0<m\leq 5$, and $0<n\leq 5$.

a, b, c, d, e, and f may satisfy a+b+c+d+e=100.

A softening point of the second solid electrolyte may be greater than or equal to about 500° C. and less than or equal to about 550° C.

The second solid electrolyte may be glass or glass ceramic.

The second solid electrolyte may be a glass ceramic in which a peak due to $Li_3PO_4$ appears in X-ray diffraction (XRD) analysis using Cu-Kα, and specifically, a $Li_3PO_4$ crystal phase having a size of greater than or equal to about 1 nm and less than or equal to about 10 nm may exist in an amorphous structure. Optionally, the second solid electrolyte may further show a peak due to L $Li_4B_7O_{12}Cl$ or $Al_2O_3$ upon X-ray diffraction (XRD) analysis using Cu-Kα.

The second solid electrolyte may have an ionic conductivity of greater than or equal to about $1.0\times10^{-7}$ S/cm.

A solid electrolyte may include a —B—O—Si—O—P—O—Zr— network-based amorphous structure.

The solid electrolyte may further include a $Li_3PO_4$ crystal phase.

The $Li_3PO_4$ crystal phase may have a size of greater than or equal to about 1 nm and less than or equal to about 10 nm.

The solid electrolyte may further include a $Li_4B_7O_{12}Cl$ crystal phase or an $Al_2O_3$ crystal phase.

Another embodiment provides an all-solid-state battery including a body including a body including a solid electrolyte layer and a positive electrode layer and a negative electrode layer alternately stacked with the solid electrolyte layer disposed therebetween; and a first external electrode and a second external electrode respectively disposed on both sides of the body, wherein the solid electrolyte layer includes any one of the first solid electrolyte and the second solid electrolyte.

The positive electrode layer and the negative electrode layer may each independently include a current collecting layer and an electrode active material layer on the current collecting layer; wherein the current collecting layer and the electrode active material layer each independently include any one of the first solid electrolyte and the second solid electrolyte and a carbon-based conductive material; and the electrode active material layer may further include an electrode active material.

Advantageous Effects of Invention

The first solid electrolyte has high ionic conductivity, low interfacial resistance between the electrode and the electrolyte, suppressed thermal expansion and strong strength, so that a multi-layered microchip-type all-solid-state battery may be manufactured through a co-firing process.

Furthermore, the second solid electrolyte has a higher ionic conductivity compared to the first solid electrolyte, and thus the performance of the microchip-type all-solid-state battery may be further improved.

DESCRIPTION OF THE DRAWINGS

FIG. 2 is a schematic cross-sectional view of an all-solid-state battery according to an embodiment.

FIG. 6 shows the results of X-ray diffraction (XRD, Bruker AXS D4-Endeavor XRD) analysis using Cu-Kα on the solid electrolytes according to Example 1.

FIG. 7 shows the results of X-ray diffraction (XRD, Bruker AXS D4-Endeavor XRD) analysis using Cu-Kα on the solid electrolytes according to Example 5.

FIG. 8 shows the results of X-ray diffraction (XRD, Bruker AXS D4-Endeavor XRD) analysis using Cu-Kα on the solid electrolytes according to Example 6.

FIG. 9 shows the results of X-ray diffraction (XRD, Bruker AXS D4-Endeavor XRD) analysis using Cu-Kα on the solid electrolytes according to Example 7 of the present invention.

FIG. 10 shows the results of X-ray diffraction (XRD, Bruker AXS D4-Endeavor XRD) analysis using Cu-Kα on the solid electrolytes according to Example 8 of the present invention.

FIG. 11 shows an image of a local area of the solid electrolyte according to Example 1 taken using TEM equipment (right enlarged view).

FIG. 12 shows an image of a local area of the solid electrolyte according to Example 8 using a TEM device.

FIG. 13 shows resistance measurement results for each of the solid electrolytes of Examples 1 and 8.

FIG. 14 shows electrochemical evaluation results for an all-solid-state battery cell according to Example 1.

MODE FOR THE INVENTION

Figure 1:
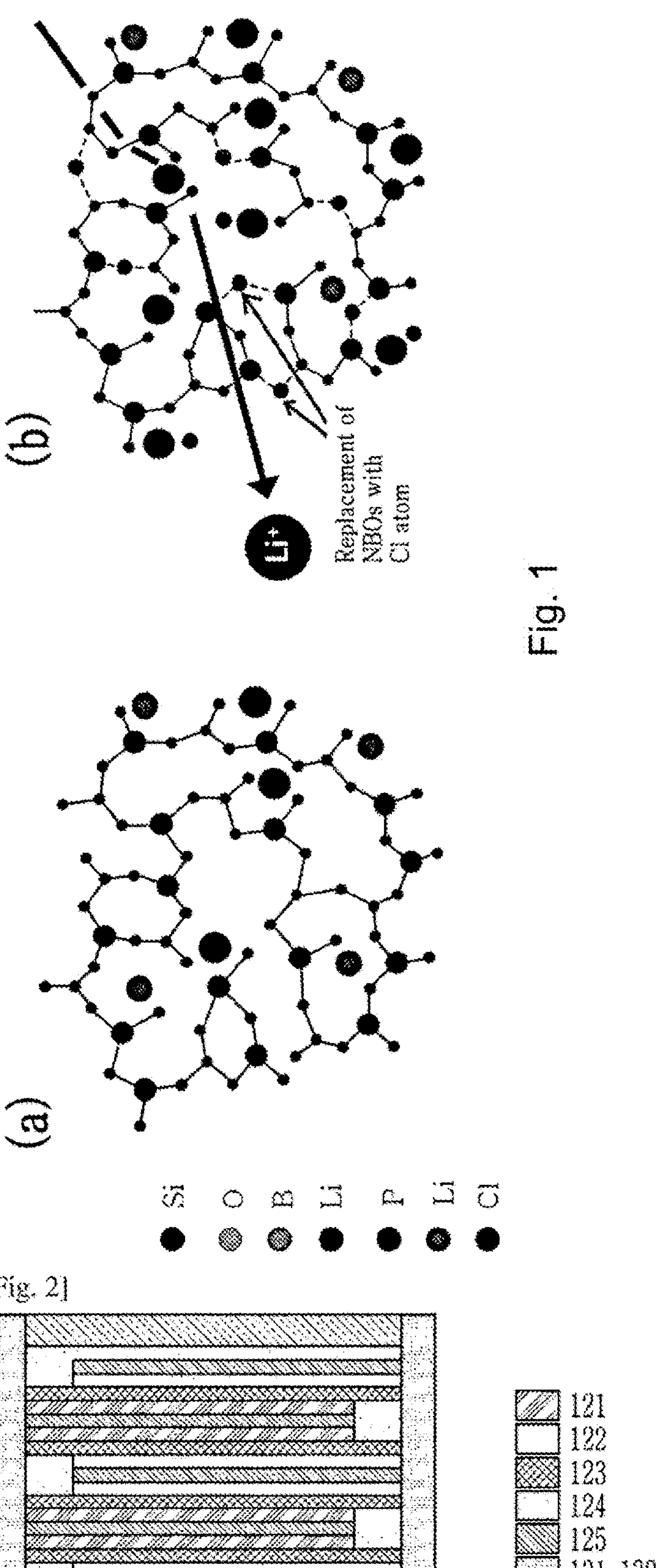
FIG. 1 illustrates a connection relationship between elements constituting solid electrolytes according to embodiments ((a): first solid electrolyte, (b): second solid electrolyte).

The present disclosure will be described more fully hereinafter with reference to the accompanying drawings, in which embodiments of the invention are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present invention includes all modifications, equivalents, and substitutions without departing from the scope and spirit of the present invention. In addition, some constituent elements in the accompanying drawings are exaggerated, omitted, or schematically illustrated, and the size of each constituent element does not fully reflect the actual size.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Throughout the specification, a "solid electrolyte" refers to a material capable of passing an electric current by movement of ions in a solid state.

Throughout the specification, "glass" is generally a highly transparent material not crystallized but solidified during a process of dissolving a mixture of silica sand, soda ash, carbonate lime, etc. at a high temperature and cooling it and may be described as "amorphous glass" in order to distinguish it from "glass ceramic" described later.

Throughout the specification, the "glass ceramic" is an aggregate of uniform microcrystals obtained by heat-treating a glass molded body at a transition temperature or higher and a softening temperature or lower and called to be "crystallized glass."

The "glass ceramic" has an amorphous phase and at least one crystal phase and thus has both amorphous and crystalline characteristics. Specifically, the "glass ceramic" has high strength, stability, chemical durability at a high temperature, ionic conductivity, and the like and is suppressed from thermal expansion, compared to the amorphous glass.

Throughout the specification, the "ionic conductivity" is a criterion exhibiting ion conductive tendency of a material and theoretically increases in proportion to concentration of ions, an amount of charges, and mobility of the charges.

Hereinafter, various embodiments are described in detail with reference to the drawings.

(First Solid Electrolyte)

An embodiment provides a solid which is a glass or a glass ceramic including Li, Si, B, Zr, and P.

The first solid electrolyte has high ionic conductivity, low interfacial resistance between the electrode and electrolyte, suppressed thermal expansion and strong strength, compared to an oxide solid electrolyte including Li, Si, B, and P but not including Zr, and thus may be well manufactured into a multi-layered microchip-type all-solid-state battery through a co-firing process.

A description of the elements constituting the first solid electrolyte is as follows.

The Li, Si, and B are essential constituent elements of a generally known amorphous glass for a solid electrolyte, and also form an amorphous structure in the first solid electrolyte.

Specifically, in the first solid electrolyte, based on 100 mol % of the total amount of Li, Si, B, Zr, and P. Li may be included in an amount of greater than or equal to about 40 mol % and less than or equal to about 80 mol %, greater than or equal to about 40 mol % and less than or equal to about 70 mol %, or greater than or equal to about 40 mol % and less than or equal to about 60 mol %. Si may be included in an amount of greater than about 0 mol % and less than or equal to about 30 mol %, greater than or equal to about 3 mol % and less than or equal to about 20 mol %, or greater than or equal to about 5 mol % and less than or equal to about 15 mol %. B may be included in an amount of greater than about 0 mol % and less than or equal to about 60 mol %, greater than or equal to about 5 mol % and less than or equal to about 40 mol %, or greater than or equal to about 10 mol % and less than or equal to about 20 mol %. The meaning of the term "about" may include a process error occurring in the manufacturing process, a measurement error, or the like, recognizable by one of ordinary skill in the art. For example, being "about X" in which "X" is a number may mean being exactly "X" or may include a tolerable deviation from "X" due to a process error occurring in the manufacturing process, a measurement error, or the like, recognizable by one of ordinary skill in the art.

Meanwhile, Zr and P may form an amorphous structure having a specific structure together with Li, Si, and B. Specifically, (a) of FIG. 1 shows a connection relationship between elements constituting the first solid electrolyte. As shown in (a) of FIG. 1, in the first solid electrolyte, Li, Si, B, Zr, and P provides —B—O—Si—O—P—O—Zr— network-based amorphous structure forming holes in the non-bridged oxide (NBO) structure, and as such, properties such as high ionic conductivity, low thermal expansion, and high strength may be achieved.

In contrast, an oxide solid electrolyte including Li, Si, B, and P but not including Zr may form an amorphous structure based on a —B—O—Si—O—P—O— network, which forms an unstable structure with fewer holes in the non-bridged oxide (NBO) structure, unlike the —B—O—Si—O—P—O—Zr— network-based amorphous structure. Accordingly, characteristics such as ionic conductivity, thermal expansion, and strength may be inferior to those of the first solid electrolyte.

Specifically, Zr may be included in an amount of greater than about 0 mol % and less than or equal to about 50 mol %, greater than or equal to about 1 mol % and less than or equal to about 20 mol %, or greater than or equal to about 1 mol % and less than or equal to about 10 mol %. 2P may be included in an amount of greater than about 0 mol % and less than or equal to about 60 mol %, greater than or equal to about 1 mol % and less than or equal to about 20 mol %, or greater than or equal to about 5 mol % and less than or equal to about 15 mol %.

For reference, a molar content of each element based on 100 mol % of the total amount of 2Li, Si, 2B, Zr, and 2P in the first solid electrolyte may be confirmed through ICP analysis.

A mole fraction of Li/(Si+B+Zr) in the first solid electrolyte may be about 0.5 to about 5.

This represents the molar content of the main elements constituting the first solid electrolyte as a relational expression. As mentioned above, Li, Si, and B are generally known essential elements of amorphous glass, and Zr is an element that contributes to forming an amorphous structure of a specific network structure of the first solid electrolyte. When they satisfy the relational expression above, the —B—O—Si—O—P—O—Zr— network-based amorphous structure and the resulting holes in the non-bridged oxide (NBO) structure may be effectively formed.

For example, the mole fraction of Li/(Si+B+Zr) in the first solid electrolyte may be greater than or equal to about 0.5, greater than or equal to about 1, or greater than or equal to about 1.5, and less than or equal to about 5, less than or equal to about 4, less than or equal to about 3, or less than or equal to about 2.

For reference, the mole fraction of Li/(Si+B+Zr) in the first solid electrolyte may be calculated from the molar content of each element based on 100 mol % of the total amount of Li, Si, B, Zr, and P in the first solid electrolyte.

The first solid electrolyte may be represented by Chemical Formula 1:

$$a(Li_2O)\cdot b(SiO_2)\cdot c(B_2O_3)\cdot d(P_2O_5)\cdot e(ZrO_2)$$ [Chemical Formula 1]

wherein, in Chemical Formula 1, a to e are real numbers representing mole fractions, $40\leq a\leq 80$, $40\leq a\leq 0$, or $40\leq a\leq 60$; $0<b\leq 30$, $3\leq b\leq 20$, or $5\leq b\leq 15$; $0<c\leq 60$, $5\leq c\leq 40$, or $10\leq c\leq 20$; $0<d\leq 60$, $1\leq d\leq 20$, or $1\leq d\leq 15$; and $0<e\leq 50$, $1\leq e\leq 20$, or $1\leq e\leq 10$.

The explanations for these are the same as the descriptions of the molar content of each element based on 100 mol % of the total amount of Li, Si, B, Zr, and P in the first solid electrolyte.

The first solid electrolyte may be softened in a specific temperature range based on its amorphous characteristics.

A softening point of the first solid electrolyte may be greater than or equal to about 500° C., greater than or equal to about 505° C., or greater than or equal to about 510° C., and less than or equal to about 550° C., less than or equal to about 540° C., or less than or equal to about 530° C.

For reference, the softening point of the first solid electrolyte may be confirmed through TMA thermal analysis.

The first solid electrolyte may be glass or glass ceramic.

As defined above, "glass" is an amorphous material, and "glass ceramic" is a material including one or more crystal phases in an amorphous structure.

In particular, when the first solid electrolyte is a glass ceramic, the ionic conductivity is high, the interfacial resistance between the electrode and the electrolyte is low, the thermal expansion is suppressed and the strength is strong, compared to the case of an amorphous glass, and thus it is advantageous for manufacturing a multi-layered microchip-type all-solid-state battery through a co-firing process.

Specifically, when the first solid electrolyte is a glass ceramic, a peak due to $Li_3PO_4$ may appear in an X-ray diffraction (XRD) analysis using Cu-Kα in a range of 2θ of about 22° to about 25°. Here, the amorphous structure is inferred to include a —B—O—Si—O—P—O—Zr— network, and the amorphous structure based on the —B—O—Si—O—P—O—Zr— network may have holes in a non-bridged oxide (NBO) structure.

In addition, when the first solid electrolyte is a glass ceramic, through analysis such as FE-SEM, TEM, etc., a crystal phase having a size of greater than or equal to about 1 nm, or greater than or equal to about 3 nm, and less than or equal to about 10 nm or less than or equal to about 5 nm in the amorphous structure may be identified.

In summary, when the first solid electrolyte is a glass ceramic, in an amorphous structure including a —B—O—Si—O—P—O—Zr— network, the $Li_3PO_4$ crystal phase having a size of greater than or equal to about 1 nm, or greater than or equal to about 3 nm and less than or equal to about 10 nm or less than or equal to about 5 nm may exist.

The first solid electrolyte may have an ionic conductivity of greater than or equal to about $1.0\times10^{-8}$ S/cm. This is obtained by applying InGa paste, Ag paste, etc. to both sides of the solid electrolyte layer including the first solid electrolyte therebetween; or by sputtering Au, Pt, Ag, etc. to form a metal electrode, manufacturing all-solid-state battery samples, mounting them on a jig, and measuring EIS voltages within the range of 100 mV reference frequency $10^{-6}$ Hz.

The producing method of the first solid electrolyte is not particularly limited, and may follow a generally known producing method of an oxide-based solid electrolyte.

As a generally known method for producing an oxide-based solid electrolyte, various glass production methods such as a conventional melt-quenching method, a press melt-quenching method, and a twin-roller melt quenching method may be adopted. A crucible in a device was a product using alumina, high-density alumina, platinum-coating, or iridium-coating.

The aforementioned raw materials are mixed according to a stoichiometric molar ratio of a target composition and then, heat-treated in a range of about 450° C. to about 700° C. to sufficiently volatilize ammonia in the mixed raw materials and continuously, maintained at about 1200° C. for about 2 hours to perform a vitrification process. The vitrified molten solution is cooled at about 500° C. to about 700° C. and recovered as a cullet-type bulk material. This cullets are powdered without secondary particles (agglomerates) in anhydrous ethanol through a constant pulverization process and dried and then, classified, obtaining glass ceramics in the form of particles with an average particle diameter (D50) of about 1.5 to about 3.0 μm.

(Second Solid Electrolyte)

Another embodiment provides a second solid electrolyte that includes an oxide including Li, Si, B, Zr, and P; and further includes, as the second component, an oxide or a salt including at least one element of Li, Al, Na, Mg, K, Ca, Ti, V, Cr, Mn, Fe, Co, Ni, Cu, Zn, Ga, Se, Rb, S, Y, Nb, Mo, Ag, In, Sn, Sb, Cs, Ba, Hf, Ta, W, Pb, Bi, Au, La, Nd, Eu, I, Cl, Br, or F.

The second solid electrolyte further includes a specific element or atomic group, compared to the first solid electrolyte, and thus may accomplish much higher ionic conductivity and much improve performance of a microchip-type all-solid-state battery.

(b) of FIG. 1 shows a connection relationship between elements constituting the second solid electrolyte. Herein, the case of including Li and Cl as the second component was exemplified.

Referring to (b) of FIG. 1, in the second solid electrolyte like the first solid electrolyte, a —B—O—Si—P—O—Zr— network-based amorphous structure forms holes of a non-bridged oxide (NBO) structure. However, since the second solid electrolyte further includes the second component, compared to the first solid electrolyte, the holes of a non-bridged oxide (NBO) structure have a larger size. In addition, some of an anion component (Cl) as the second component is substituted with or electrostatically coupled to oxygen and thus may lower electronegativity of the second solid electrolyte. As a result, the second component may make an effective ion pathway to easily pass $Li^+$ cations ejected from the active material electrode.

Based on 100 mol % of the total amount of Li, Si, B, Zr, and P, in the second solid electrolyte, Li may be included in an amount of greater than or equal to about 40 mol % and less than or equal to about 80 mol %, Si may be included in an amount of greater than about 0 mol % and less than or equal to about 30 mol %, B may be included in an amount of greater than about 0 mol % and less than or equal to about 60 mol %, Zr may be included in an amount of greater than about 0 mol % and less than or equal to about 50 mol %, and P may be included in an amount of greater than about 0 mol % and less than or equal to about 60 mol %. A description thereof is the same as that of the first solid electrolyte.

In addition, a mole fraction of Li/(Si+B+Zr) in the second solid electrolyte may be about 0.5 to about 5. A description thereof is also the same as that of the first solid electrolyte.

For reference, although the mole fraction of Li/(Si+B+Zr) may be partially higher in the second solid electrolyte than in the first solid electrolyte, this is because the mole fraction of Li/(Si+B+Zr) is relatively higher depending on the presence of the second component.

Specifically, the second solid electrolyte may be represented by Chemical Formula 2:

$$a(Li_2O)\cdot b(SiO_2)\cdot c(B_2O_3)\cdot d(P_2O_5)\cdot e(ZrO_2)\cdot f(X_mY_n) \quad \text{[Chemical Formula 2]}$$

In Chemical Formula 2, a to f are real numbers representing mole fractions, $40 \leq a \leq 80$, $40 \leq a \leq 0$, or $40 \leq a \leq 60$; $0 < b \leq 30$, $3 \leq b \leq 20$, or $5 \leq b \leq 115$; $0 < c \leq 60$, $5 \leq c \leq 40$, or $10 \leq c \leq 20$; $0 < d \leq 60$, $1 \leq d \leq 20$, or $1 \leq d \leq 15$; $0 < e \leq 50$, $1 \leq e \leq 20$, or $1 \leq e \leq 10$; $0 \leq f \leq 50$, $1 \leq f \leq 10$, or $1 \leq f \leq 5$; X is Li, Al, or a combination thereof; Y is Cl, O, or a combination thereof; $0 < m \leq 5$ or $1 \leq m \leq 3$; and $0 < n \leq 5$ or $1 \leq n \leq 4$.

The second solid electrolyte may also be softened in a specific temperature range based on amorphous characteristics.

Specifically, a softening point of the second solid electrolyte may be within a temperature range of greater than or equal to about 500° C. and less than or equal to about 550° C. A description thereof is also the same as that of the first solid electrolyte.

The second solid electrolyte may also be glass or glass ceramic, and the description thereof is the same as that of the first solid electrolyte.

Particularly, when the second solid electrolyte is a glass ceramic, a peak due to $Li_3PO_4$ may appear in a range of 2θ of about 22° to about 25°, a peak due to $Li_4B_7O_{12}Cl$ may appear in the range of 2θ of about 420 to about 450, or a peak due to $Al_2O_3$ may further appear in the range of 2θ of about 15° to about 200 in an X-ray diffraction (XRD) analysis using Cu-Kα. The peak due to $Li_3PO_4$ appears in common with the case where the first solid electrolyte is glass ceramic, and the peak due to $Li_4B_7O_{12}Cl$ and the peak due to $Al_2O_3$ appear due to the second component.

In summary, when the second solid electrolyte is glass ceramic, a $Li_3PO_4$ crystal phase with a size of greater than or equal to about 1 nm or greater than or equal to about 3 nm, and less than or equal to about 10 urn or less than or equal to about 5 nm is necessarily present in the amorphous structure including the —B—O—Si—O—P—O—Zr— network, and optionally, a $Li_4B_7O_{12}Cl$ crystal phase or an $Al_2C_3$ crystal phase with the same or similar size to that of the $Li_3PO_4$ crystal phase may be further present.

As described above, the second solid electrolyte may exhibit higher ionic conductivity than the first solid electrolyte. Specifically, the ionic conductivity of the second solid electrolyte may be greater than or equal to about $1.0 \times 10^{-7}$ S/cm. Its measurement method is as described above.

The second solid electrolyte may be prepared by adding an additive to the first solid electrolyte in a stoichiometric molar ratio according to a target composition and then, heat-treated at about 525° C. to about 530° C. under an air atmosphere for about 8 hours to about 10 hours.

(All-Solid-State Battery)

Another embodiment provides an all-solid-state battery including a body including a body including a solid electrolyte layer and a positive electrode layer and a negative electrode layer alternately stacked with the solid electrolyte layer disposed therebetween; and a first external electrode and a second external electrode respectively disposed on both sides of the body. The solid electrolyte layer includes any one of the first solid electrolyte and the second solid electrolyte.

The all-solid-state battery of the embodiment may be a microchip-type all-solid-state battery. As mentioned above, the microchip-type all-solid-state battery basically has battery characteristics and is sometimes treated as equivalent to IT parts such as MLCC, a power inductor part, and the like.

The microchip-type all-solid-state battery itself like a chip may be SMD-mounted on a board and in addition, have more circuit design freedom on the like a passive device.

In the microchip-type all-solid-state battery, an oxide-based solid electrolyte is generally used rather than a sulfide-based solid electrolyte or a polymer-based solid electrolyte. The oxide-based solid electrolyte has advantages of a wide electrochemical potential window, excellent suppression of secondary interface reaction, a low manufacturing cost, applicability of various composition ranges, etc. and may realize a multi-layered microchip-type all-solid-state battery through a co-firing process.

In particular, since the all-solid-state battery of an embodiment includes any one of the first solid electrolyte and the second solid electrolyte in the solid electrolyte layer may exhibit excellent performance and durability, compared to the case where the oxide solid electrolyte including Li, Si, B, and P but not including Zr is applied to the solid electrolyte layer.

FIG. 2 is a schematic cross-sectional view of an all-solid-state battery according to an embodiment.

Referring to FIG. 2, the all-solid-state battery may include a body including a solid electrolyte layer 123 and positive and negative electrode layers alternately stacked with the solid electrolyte layer 123 in the middle. In addition, the all-solid-state battery may further include a first external electrode 131 and a second external electrode 132 respectively disposed on both sides of the body.

Specifically, the all-solid-state battery includes an electrode layer and a solid electrolyte layer disposed adjacent to the electrode layer in the stacking direction. The electrode layer may basically include a current collector 125 and electrode active material layers 121 and 122 coated on one surface or both surfaces of the current collector 125.

For example, the electrode layer disposed at the top of the stacking direction may be formed by coating the negative electrode active material layer 122 on one surface of the negative electrode current collector 125, and another electrode layer disposed at the bottom may be formed by coating the positive electrode active material layer 121 on one surface of the positive electrode current collector 125. In addition, the electrode layers disposed at the top and the bottom may be formed by coating the positive electrode active material layer 121 on both surfaces of the positive electrode current collector 125 and the negative electrode active material layer 122 on both surfaces of the negative electrode current collector 125.

A solid electrolyte layer 123 may be disposed and stacked between the positive electrode layer and the negative electrode layer. Accordingly, the solid electrolyte layer 123 may be disposed in the stacking direction adjacent between the positive electrode active material layer 121 of the positive electrode layer and the negative electrode active material layer 122 of the negative electrode layer. Accordingly, in the all-solid-state battery, a plurality of the positive electrode layers and a plurality of the negative electrode layer are alternately disposed, and a plurality of the solid electrolyte layers 123 may be disposed therebetween and stacked.

An insulation layer 124 may be disposed along edges of the positive electrode layers and the negative electrode layers. The insulation layer 124 is disposed on the solid electrolyte layer 130 and may be formed to be laterally adjacent to edges of the positive electrode layer or the negative electrode layer. Accordingly, the insulation layer 150 may be disposed on the same layer as the positive electrode layer and the negative electrode layer, respectively. The insulation layer 150 may be formed by using the same material as the solid electrolyte layer 123. Accordingly, in the all-solid-state battery, the insulation layer 150 and the solid electrolyte layer 123 are not distinguished each other on the boundary but integrally formed into a one body of the solid electrolyte layer 123.

The positive electrode layer, the solid electrolyte layer 123, the negative electrode layer, and the insulation layer 150 are stacked as aforementioned, constituting a cell stack of an all-solid-state battery. At the upper and lower ends of the cell stack of the all-solid-state battery, a protective layer may be formed of an insulating material. In addition, at both sides of the cell stack of the all-solid-state battery, a terminal end of the positive electrode current collector 125 and a terminal end of the negative electrode current collector 125 are exposed, and the external electrodes 131 and 132 are connected to the exposed terminal ends and coupled therewith. In other words, the external electrodes 131 and 132 may be respectively connected to the terminal end of the positive electrode current collector 125 to have a positive electrode and also, to the terminal end of the negative electrode current collector 125 to have a negative electrode. When the terminal end of the positive electrode current collector 125 and the terminal end of the negative electrode current collector 125 are configured to face opposite directions each other, the external electrodes 131 and 132 also may be respectively located at both sides.

The positive electrode layer, the solid electrolyte layer 123, and the negative electrode layer may be stacked and thus form a cell stack of an all-solid-state battery. At the top and the bottom of the cell stack of the all-solid-state battery, a protective layer 140 may be formed of an insulating material, and this insulating material may be the same material as the solid electrolyte layer 123.

The positive electrode active material included in the positive electrode layer may include a compound (lithiated intercalation compound) capable of intercalating and deintercallating lithium. Specifically, a composite oxide of lithium and at least one metal of cobalt, manganese, nickel, or a combination thereof may be used, and a specific example thereof may be a compound represented by any one of the following chemical formulas. $Li_aA_{1-b}R_bD_2$ (wherein, in the above chemical formula, $0.90 \le a \le 1.8$ and $0 \le b \le 0.5$); $Li_aE_{1-b}R_bO_{2-c}D_c$ (wherein, in the above chemical formula, $0.90 \le a \le 1.8$, $0 \le b \le 0.5$, and $0 \le c \le 0.05$); $LiE_{2-b}R_bO_{4-c}D_c$ (wherein, in the above chemical formula, $0 \le b \le 0.5$, $0 \le c \le 0.05$); $Li_aNi_{1-b-c}Co_bR_cD_\alpha$ (wherein, in the above chemical formula, $0.90 \le a \le 1.8$, $0 \le b \le 0.5$, $0 \le c \le 0.05$ and $0 < \alpha \le 2$); $Li_aNi_{1-b-c}Co_bR_cO_{2-\alpha}Z_\alpha$ (wherein, in the above chemical formula, $0.90 \le a \le 0.8$, $0 \le b \le 0.5$, $0 \le c \le 0.05$ and $0 < \alpha < 2$); $Li_aNi_{1-b-c}Co_bR_cO_{2-\alpha}Z_2$ (wherein, in the above chemical formula, $0.90 \le a \le 1.8$, $0 \le b \le 0.5$, $0 \le c \le 0.05$ and $0 < \alpha < 2$); $Li_aNi_{1-b-c}Mn_bR_cD_\alpha$ (wherein, in the above chemical formula, $0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_\alpha$ (wherein, in the above chemical formula, $0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_2$ (wherein, in the above chemical formula, $0.90 \le a \le 1.8$, $0 \le b \le 0.5$, $0 \le c \le 0.05$ and $0 < \alpha < 2$); $Li_aNi_bE_cG_dO_2$ (wherein, in the above chemical formula, $0.90 \le a \le 1.8$, $0 \le b \le 0.9$, $0 \le c \le 0.5$ and $0.001 \le d \le 0.1$); $Li_aNi_bCo_cMn_dG_eO_2$ (wherein, in the above chemical formula, $0.90 \le a \le 1.8$, $0 \le b \le 0.9$, $0 \le c \le 0.5$, $0 \le d \le 0.5$ and $0.001 \le e \le 0.1$); $Li_aNiG_bO_2$ (wherein, in the above chemical formula, $0.90 \le a \le 1.8$ and $0.001 \le b \le 0.1$); $Li_aCoG_bO_2$ (wherein, in the above chemical formula, $0.90 \le a \le 1.8$ and $0.001 \le b \le 0.1$); $Li_aMnG_bO_2$ (wherein, in the above chemical formula, $0.90 \le a \le 1.8$ and $0.001 \le b \le 0.1$); $Li_aMn_2G_bO_4$ (wherein, in the above chemical formula, $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may include the positive active material with the coating layer, or a compound of the active material and the active material coated with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not cause any side effects on the properties of the positive active material (e.g., spray coating, dipping, etc.), which is well known to persons having ordinary skill in this art, so a detailed description thereof is omitted.

The negative electrode active material included in the negative electrode layer may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material which is any generally-used carbon-based negative active material in a lithium ion secondary battery and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon (fired carbon at a low temperature) or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, or Sn.

The material capable of doping and dedoping lithium may be Si, $SiO_x$ ($0 < x < 2$), a Si—C composite, a Si-Q alloy (wherein Q is selected from an alkali metal, an alkaline-earth metal, Group 13 to 1.6 elements, a transition element, a rare earth element, and a combination thereof, and not Si), Sn, $SnO_2$, a Sn—C composite, Sn—R (wherein R is selected from an alkali metal, an alkaline-earth metal, Group 13 to 16 elements, a transition element, a rare earth element, and a combination thereof, and not Sn). The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition elements oxide may include vanadium oxide, lithium vanadium oxide, lithium vanadium oxide, lithium vanadium phosphate ($Li_3V_2(PO_4)_3$, LVP), and the like.

DETAILED DESCRIPTION OF THE EMBODIMENTS

Hereinafter, examples of the present disclosure and comparative examples are described. These examples, however, are not in any sense to be interpreted as limiting the scope of the present disclosure.

Example 1

In order to produce glass ceramic, $Li_2CO_3$ (purity: 99%); $SiO_2$ (purity: 99.8%); $B_2O_3$ (purity: 95%); $ZrO_2$ (purity: 98%); and $P_2O_5$ (purity: 98%), or $(NH_4)_2HPO_4$ (purity: 98%) were used as raw materials.

A twin-roller melt quenching method was used as a method of producing glass ceramics, and the crucible in the apparatus using the twin-roller melt quenching method was a platinum product.

In order to obtain $57(Li_2O)\cdot10(SiO_2)\cdot18(B_2O_3)\cdot12(P_2O_5)\cdot3(ZrO_2)$ [mol %] as a target composition, the raw materials were mixed according to a stoichiometric molar ratio, heat-treated within a range of 450° C. to 700° C. to sufficiently volatilize ammonia in the mixed raw materials, and then, vitrificated after consecutively maintained at 1200° C. for about 2 hours. The vitrified molten metal was recovered as a cullet-type bulk material after cooled within a range of 500° C. to 700° C. These cullets were pulverized through a constant grinding process in anhydrous ethanol to obtain powder having no secondary particles (agglomerates) and then, dried and classified to obtain glass ceramic with particles having an average particle diameter (D50) of 1.5 μm to 3.0 μm. The glass ceramic was used as a solid electrolyte of Example 1.

Example 2

A solid electrolyte of Example 2 was prepared in the same manner as in Example 1 except that the target composition was changed into $57(Li_2O)\cdot10(SiO_2)\cdot18(B_2O_3)\cdot14(P_2O_5)\cdot1(ZrO_2)$ [mol %].

Example 3

A solid electrolyte of Example 3 was prepared in the same manner as in Example 1 except that the target composition was changed into $57(Li_2O)\cdot10(SiO_2)\cdot18(B_2O_3)\cdot10(P_2O_5)\cdot5(ZrO_2)$ [mol %].

Example 4

A solid electrolyte of Example 4 was prepared in the same manner as in Example 1 except that the target composition was changed into $57(Li_2O)\cdot10(SiO_2)\cdot18(B_2O_3)\cdot5(P_2O_5)\cdot10(ZrO_2)$ [mol %].

Example 5

A mixed powder was prepared by post-adding LiCl to the glass ceramic according to Example 1. Based on 100 wt % of the mixed powder, a content of the post-added LiCl was 5 wt %.

Subsequently, the mixed powder was heat-treated within a temperature range of 525 to 530° C. under an air atmosphere for 8 hours to 10 hours.

Accordingly, the solid electrolyte of Example 5 was obtained, wherein a target (expected) composition of the corresponding solid electrolyte was $56(Li_2O)\cdot10(SiO_2)\cdot16(B_2O_3)\cdot10(P_2O_{50})\cdot3(ZrO_2)\cdot5(LiCl)$ [mol %].

Example 6

A solid electrolyte of Example 6 was prepared in the same manner as in Example 5 except that $Li_3PO_4$ was post-added instead of LiCl to have a target composition of $57(Li_2O)\cdot10(SiO_2)\cdot16(B_2O_3\cdot14P_2O_5)\cdot3(ZrO_2)$ [mol %].

Example 7

A solid electrolyte of Example 7 was prepared in the same manner as in Example 5 except that $Li_2CO_3$ was post-added instead of LiCl to have a target composition of $61(Li_2O)\cdot10(SiO_2)\cdot16(B_2O_3)\cdot10(P_2O_5)\cdot3(ZrO_2)$[mol %].

Example 8

A solid electrolyte of Example 8 was prepared in the same manner as in Example 5 except that $\alpha$-$Al_2O_3$ was post-added instead of LiCl to have a target composition of $56(Li_2O)\cdot10(SiO_2)\cdot16(B_2O_3)\cdot10(P_2O_5)\cdot3(ZrO_2)\cdot5(Al_2O_3)$ [mol %].

Example 9

A solid electrolyte of Example 9 was prepared in the same manner as in Example 8 except that the target composition was changed into $56(Li_2O)\cdot10(SiO_2)\cdot16(B_2O_3)\cdot10(P_2O_5)\cdot7(ZrO_2)\cdot1(Al_2O_3)$ [mol %].

Example 10

A solid electrolyte of Example 10 was prepared in the same manner as in Example 8 except that the target composition was changed into $56(Li_2O)\cdot10(SiO_2)\cdot16(B_2O_3)\cdot10(P_2O_5)\cdot5(ZrO_2)\cdot3(Al_2O_3)$ [mol %].

Comparative Example 1

A solid electrolyte of Comparative Example 1 was prepared in the same manner as in Example 1 except that the target composition was changed into $57(Li_2O)\cdot10(SiO_2)\cdot18(B_2O_3)\cdot15(P_2O_5)$ [mol %].

Comparative Example 2

A solid electrolyte of Comparative Example 2 was prepared in the same manner as in Example 1 except that the target composition was changed into $57(Li_2O)\cdot10(SiO_2)\cdot18(B_2O_3)\cdot12(P_2O_5)\cdot3(GeO_2)$ [mol %] by suing $GeO_2$ instead of ZrO2 as a raw material.

For reference, the target compositions used to prepare each solid electrolyte of Examples 1 to 10 and Comparative Examples 1 and 2 were shown in Table 1.

TABLE 1

| (unit: mol %) | | | | | | | | |
|---|---|---|---|---|---|---|---|---|
| | $Li_2O$ | $SiO_2$ | $B_2O_3$ | $P_2O_5$ | $ZrO_2$ | $X_mY_n$ | Total | Note |
| Example 1 | 57 | 10 | 18 | 12 | 3 | — | 100 | — |
| Example 2 | 57 | 10 | 18 | 14 | 1 | — | 100 | — |
| Example 3 | 57 | 10 | 18 | 10 | 5 | — | 100 | — |
| Example 4 | 57 | 10 | 18 | 5 | 10 | — | 100 | — |
| Example 5 | 56 | 10 | 16 | 10 | 3 | 5 | 100 | $X_mY_n$ = LiCl |
| Example 6 | 57 | 10 | 16 | 14 | 3 | — | 100 | — |
| Example 7 | 61 | 10 | 16 | 10 | 3 | — | 100 | — |
| Example 8 | 56 | 10 | 16 | 10 | 3 | 5 | 100 | $X_mY_n$ = $\alpha$-$Al_2O_3$ |
| Example 9 | 56 | 10 | 16 | 10 | 7 | 1 | 100 | $X_mY_n$ = $\alpha$-$Al_2O_3$ |
| Example 10 | 56 | 10 | 16 | 10 | 5 | 3 | 100 | $X_mY_n$ = $\alpha$-$Al_2O_3$ |
| Comparative Example 1 | 57 | 10 | 18 | 15 | — | — | 100 | — |
| Comparative Example 2 | 57 | 10 | 18 | 12 | — | 3 | 100 | $X_mY_n$ = $GeO_2$ |

Evaluation Example 1: Evaluation of Solid Electrolytes (1) ICP Analysis

Each solid electrolyte of Examples 1 and 8 was ICP analyzed to measure mole fractions of major elements.

The ICP analysis was performed by using an inductively coupled plasma emission analyzer (ICP-OES, Device name: Optima 7300DV, Manufacturer: PerkinElmer Inc.). Specifically, about 0.7 g of a solid electrolyte sample was put in a platinum (Pt) crucible, and about 1 mL of concentrated sulfuric acid (98 wt %, electronic grade) was added thereto and then, heated at 300° C. for 3 hours, and incinerated with a program of the following steps 1 to 3 in an electric furnace (Lindberg Blue M, Thermofisher Scientific Corp.)

1) Step 1: initial temp 0° C., rate (temp/hr) 180° C./hr, temp (hold time) 180° C. (1 hr)
2) Step 2: initial temp 180° C., rate (temp/hr) 85° C./hr, temp (hold time) 370° C. (2 hr)
3) Step 3: initial temp 370° C., rate (temp/hr) 47° C./hr, temp (hold time) 510° C. (3 hr)

Subsequently, after adding 1 mL of concentrated nitric acid (48 wt %) and 20 µl of concentrated hydrofluoric acid (50 wt %) to the residue and then, scaling the platinum crucible and shaking it for 30 minutes or more, 1 mL of boric acid was added thereto and then, stored at 0° C. for 2 hours or more and then, diluted with 30 mL of ultrapure water and incinerated to perform a measurement.

Accordingly, the mole fractions of major elements of each solid electrolyte of Examples 1 and 8 were measured, and the results are shown in Table 2. In addition, the target compositions used to prepare each solid electrolyte of Examples 1 and 5 are shown in Table 2.

TABLE 2

| (unit: mol %) | | | | | | | | |
|---|---|---|---|---|---|---|---|---|
| | | $Li_2O$ | $SiO_2$ | $B_2O_3$ | $P_2O_5$ | $ZrO_2$ | $Al_2O_3$ | Total |
| Example 1 | Target composition (formula weight) | 57 | 10 | 18 | 12 | 3 | — | 100 |
| | Measurement value (ICP-OES) | 57.6 | 9 | 18.7 | 11.6 | 3.1 | — | 100 |
| Example 8 | Target composition (formula weight) | 56 | 10 | 16 | 10 | 3 | 5 | 100 |
| | Measurement value (ICP-OES) | 56.2 | 9.2 | 16.3 | 10.8 | 2.8 | 4.7 | 100 |

Referring to Table 2, although some elements were lost in the process of preparing each solid electrolyte of Examples 1 and 8, the target compositions were substantially the same as the actual measurement values.

In addition, each solid electrolyte of Examples 1 and 8 had a mole fraction of Li/(Si+B+Zr) within a range of 0.5 to 5. Specifically, based on the actual measurement values, the solid electrolyte of Example 1 had a mole fraction of Li/(Si+B+Zr) of 1.87, and the solid electrolyte of Example 8 had a mole fraction of Li/(Si+B+Zr) of about 1.99. A reason that the mole fraction of Li/(Si+B+Zr) was higher in the solid electrolyte of Example 8 than in that of Example 1 was that the mole fraction of (Si+B+Zr) decreased according to presence of the second component.

Herein, the solid electrolytes of Examples 1 and 8 were representatively evaluated, but each solid electrolyte of Examples 2 to 4, 9, and 10 and Comparative Examples 1 and 2 was also inferred to exhibit substantially the same target composition as the actual measurement value.

(2) TMA Thermal Analysis

Figure 3:
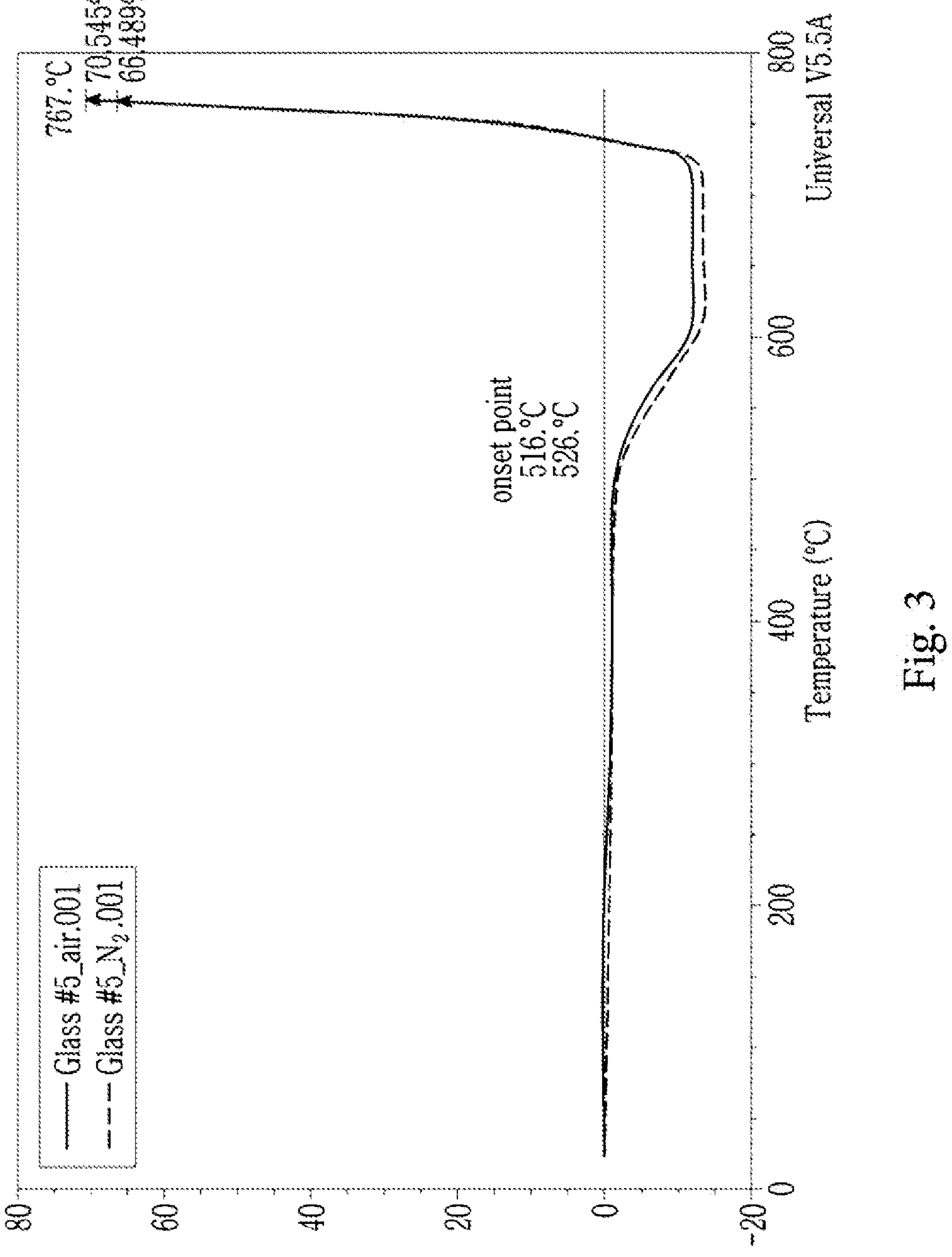
FIG. 3 shows the results of thermomechanical analysis (TMA) on the solid electrolytes according to Example 1.
Figure 4:
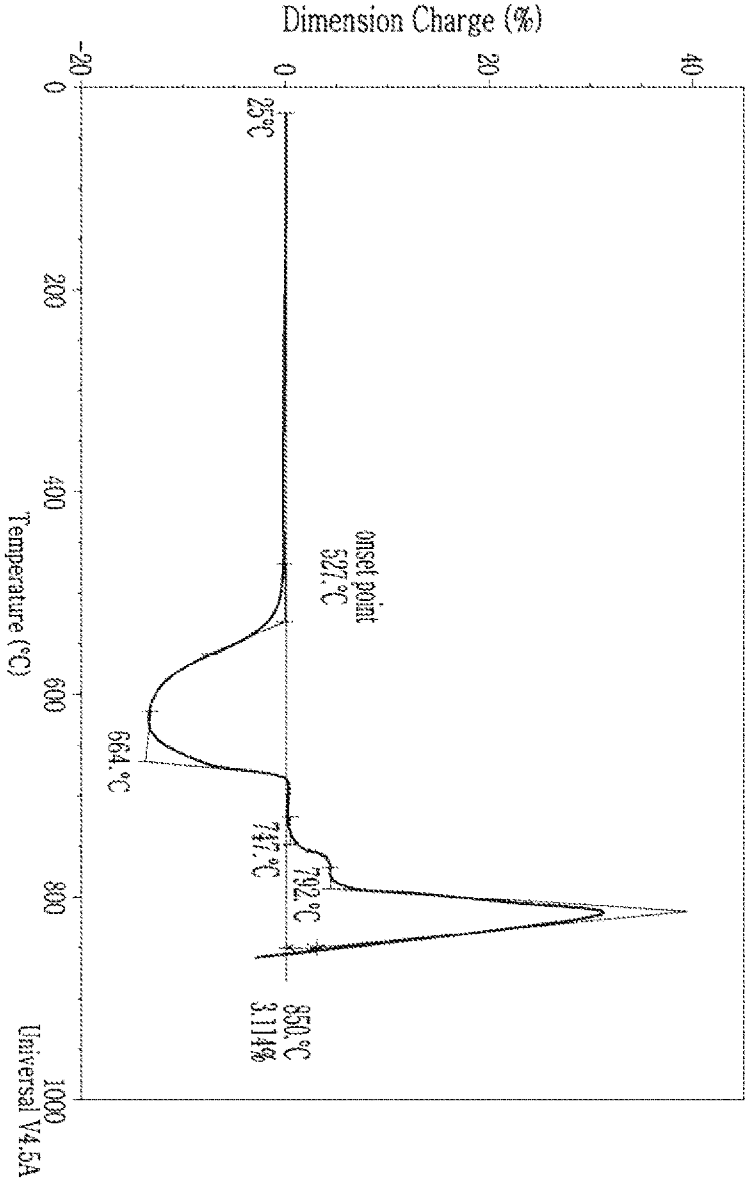
FIG. 4 shows the results of thermomechanical analysis (TMA) on the solid electrolytes according to Example 8.

Each solid electrolyte of Examples 1 and 8 was thermomechanically analyzed (TMA), and the analysis results are shown in FIGS. 3 and 4.

Specifically, in an air and nitrogen atmosphere, a 10 mm-long sample was placed in a TMA equipment (Q400, TA Instruments) and then, exposed to a temperature condition (starting at 30° C. and increased at 5° C./min), while a tension of 19.6 mN was applied thereto. As a temperature was increased, the sample was accompanied with a length change, wherein a temperature where the sample broke was measured. After respectively measuring MD and TD, the higher temperature was defined as a meltdown temperature of the corresponding sample.

Referring to FIGS. 3 and 4, each solid electrolyte of Examples 1 and 8 was softened at 500 to 550° C. Specifically, the solid electrolyte of Example 1 started to melt at 516 to 526° C., and the solid electrolyte of Example 8 started to melt at 527° C.

Figure 5:
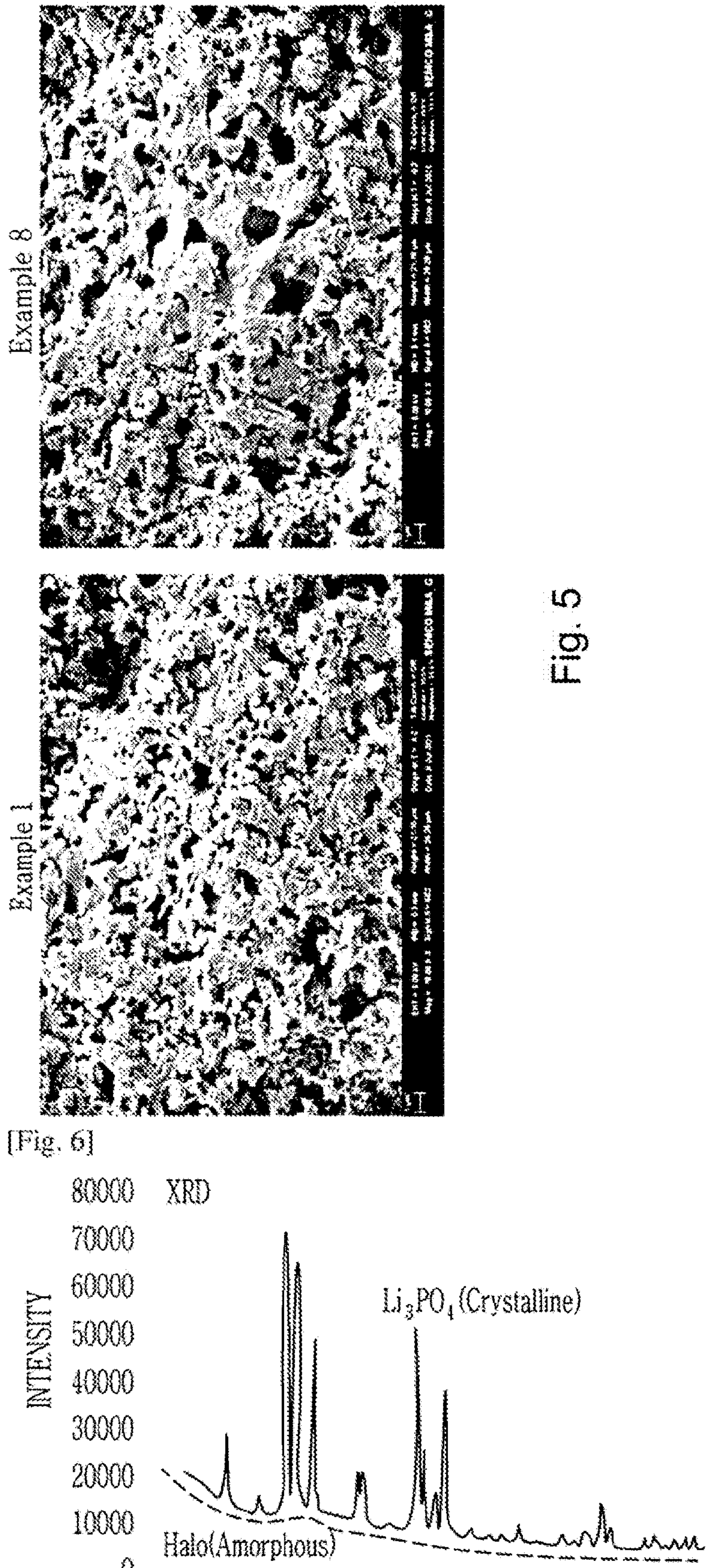
FIG. 5 shows scanning electron microscope (SEM) images of solid electrolytes according to two Examples 1 and 8 (left: Example 1, right: Example 8, scale bars are 1 μm)

On the other hand, each solid electrolyte according to Examples 1 and 8 was heated at 3° C./min in an electric furnace maintained at 530° C. under a mixed atmosphere of nitrogen ($N_2$) and air for 8 hours and then, naturally cooled, and a SEM image thereof was obtained and is shown in FIG. 6. Referring to FIG. 5, each solid electrolyte according to Examples 1 and 5 was softened after the heat treatment based on amorphous characteristics.

Herein, each solid electrolyte of Examples 1 and 8 was representatively evaluated, but each solid electrolyte of Examples 2 to 4, 9, and 10 were also assumed to have a softening point of greater than or equal to about 500° C. and less than or equal to about 550° C.

(3) XRD Analysis

An X-ray diffraction (XRD, Bruker AXS D4-Endeavor XRD) analysis of each solid electrolyte of Examples 1 and 5 to 8 was performed by using Cu-Kα, and the analysis results are shown in FIGS. 6 to 10.

Each solid electrolyte of Examples 1 and 5 to 8 commonly exhibited a peak due to $Li_3PO_4$ at 2θ ranging from 22° to 25° (common in FIG. 6 to 10). Furthermore, the solid electrolyte of Example 5 exhibited an additional peak due to $Li_4B_7O_{12}Cl$ at 2θ ranging from 42° to 45° (FIG. 7), which was caused by the addition of LiCl. In addition, the solid electrolyte of Example 8 exhibited an additional peak due to $\alpha$-$Al_2O_3$ at 2θ ranging from 15° to 20° (FIG. 10), which was caused by the addition of $\alpha$-$Al_2O_3$.

Herein, each solid electrolyte of Examples 1 and 5 to 8 was representatively evaluated, but each solid electrolyte of Examples 2 to 4, 6, and 7 was inferred to exhibit similar results to that Example 1, and each solid electrolyte of Examples 9 and 10 was inferred to exhibit similar results to that of Example 8.

(4) FE-SEM and TEM Analysis

Each solid electrolyte of Examples 1 and 8 was examined with respect to a local region by using a TEM equipment, and the results are respectively shown in FIGS. 11 and 12.

Referring to FIGS. 11 and 12, each solid electrolyte of Examples 1 and 8 commonly exhibited a 3 to 5 nm-sized crystal phase present in an amorphous structure.

Herein, each solid electrolyte of Examples 1 and 8 was representatively evaluated, but each solid electrolyte of Examples 2 to 4 was inferred to exhibit similar results to that Example 1, and each solid electrolyte of Examples 5 to 7, 9, and 10 was inferred to exhibit similar results to that of Example 8.

(5) Evaluation of Ionic Conductivity

Each solid electrolyte of Examples 1 to 8 and Comparative Examples 1 and 2 was used to manufacture all-solid-state battery samples in the following method, and ionic conductivity of the samples was measured.

First, 0.5 g of each solid electrolyte was taken and pelletized by applying a pressure of 1.5 tons with a circular die of a 14 pi diameter, obtaining green sheet-shaped solid electrolyte samples.

The solid electrolyte samples were heat-treated at 500° C. to 600° C., and metal electrodes were formed on both, sides thereof, obtaining all-solid-state battery samples. Herein, the metal electrodes were formed through sputtering InGa paste, Ag paste, and the like.

The all-solid-state battery samples were mounted on a jig regardless of positive and negative electrode directions. An EIS voltage thereof was measured within a frequency range of $10^{-6}$ Hz based on 100 mV. Each solid electrolyte of Examples 1 to 8 and Comparative Examples 1 and 2 was measured with respect to resistance, which was converted into ionic conductivity, and the results are shown in Table 3. In addition, particularly, the resistance results of the solid electrolytes according to Examples 1 and 8 are shown in FIG. 13.

TABLE 3

| | Ionic conductivity (S/cm) |
|---|---|
| Example 1 | $2.32 \times 10^{-8}$ |
| Example 2 | $5.32 \times 10^{-9}$ |
| Example 3 | $4.23 \times 10^{-9}$ |
| Example 4 | $2.32 \times 10^{-9}$ |
| Example 5 | $1.50 \times 10^{-7}$ |
| Example 6 | $2.40 \times 10^{-7}$ |
| Example 7 | $2.87 \times 10^{-7}$ |
| Example 8 | $1.24 \times 10^{-7}$ |
| Comparative Example 1 | $8.74 \times 10^{-9}$ |
| Comparative Example 2 | $7.69 \times 10^{-9}$ |

Referring to Table 3, the solid electrolyte of Example 1 was an oxide-only solid electrolyte including Li, Si, B, Zr, and P (first solid electrolyte) and had an effect of securing ionic conductivity of $1\times10^{-8}$ S/cm. In addition, referring to Table 3 and FIG. 13, the solid electrolytes of Examples 5 to 8 were a solid electrolyte including the glass ceramic as a major component and simultaneously, a specific minor component (a second solid electrolyte) and had an effect of securing ionic conductivity of $1\times10^{-7}$ S/cm.

(6) Summary

Each solid electrolyte of Examples 1 to 5 corresponded to the aforementioned first solid electrolyte (oxide including Li, Si, B, Zr, and P). These solid electrolytes were glass ceramics simultaneously having amorphous and crystalline characteristics, which had a 3 to 5 nm-sized $Li_3PO_4$ crystal phase present in the —B—O—Si—O—P—O—Zr— network-based amorphous structure, and secured ionic conductivity of $1\times10^{-8}$ S/cm.

In addition, each solid electrolyte of Examples 5 to 10 was the aforementioned second solid electrolyte (including oxide including Li, Si, B, Zr, and P as a first component; and oxide or salt including Li, Al, or Cl as a second component). These solid electrolytes also were glass ceramics simultaneously having amorphous and crystalline characteristics, which had a 3 to 5 nm-sized $Li_3PO_4$ crystal phase in a —B—O—Si—O—P—O—Zr— network-based amorphous structure and an additional crystal phase ($Li_4B_7O_{12}Cl$ or $Al_2O_3$) according to the second component, and secured ionic conductivity of $1\times10^{-7}$ S/cm.

The solid electrolytes of Examples 1 to 10 had higher ionic conductivity than the solid electrolytes of Comparative Examples 1 and 2, which was inferred to be caused particularly by Zr.

Evaluation Example 2: Evaluation of all-Solid-State Battery Cells

All-solid-state battery cells including each solid electrolyte of Examples 1 and 8 were manufactured and measured with respect to charge and discharge performance.

First. 0.5 g of a solid electrolyte was taken and pelletized by applying a pressure of 1.5 ton with a circular die with a diameter of 14 pi, obtaining a green sheet-shaped solid electrolyte sample.

Independently therefrom, 0.24 g of a solid electrolyte, 0.24 g of $Li_3V_2(PO_4)_3$, and 0.02 g of carbon black were mixed and pelletized by applying a pressure of 1.5 ton with a circular die, obtaining a green sheet-type electrode active material layer sample. Two of this electrode active material layer sample were prepared.

Independently therefrom. 0.1 g of a solid electrolyte and 0.4 g of carbon black were mixed and pelletized by applying a pressure of 1.5 ton with a circular die, obtaining a green sheet-type current collector layer sample. Two of this current collector layer sample were prepared.

The current collector layer sample/the electrode active material layer sample/the electrolyte layer sample/the electrode active material layer sample/the current collector layer sample were sequentially stacked and heat-treated at 500 to 600° C., obtaining each all-solid-state battery cell of Examples 1 and 8.

Each all-solid-state battery cell of Examples 1 and 8 was once charged and once discharged, and a charge and discharge graph thereof is shown in FIG. 14. Specifically, each all-solid-state battery cell of Examples 1 and 8 was mounted on a jig regardless of + and − electrode directions and then, charged at current density of 0.025 C-rate to a voltage of 2.4 V and discharged at the same current density to 0.001 V.

Referring to FIG. 14, the all-solid-state battery cell of Example 1 exhibited initial discharge capacity of 48 μAh (32.13 mAh/g) and a saturation discharge voltage of 1.5 to 1.6 V. In addition, the all-solid-state battery cell of Example 8 exhibited initial discharge capacity of 63 μAh (40.51 mAh/g) and a saturation discharge voltage of 1.5 to 1.6 V.

Herein, each all-solid-state battery cell of Examples 1 and 8 was representatively evaluated, but each all-solid-state battery cell of Examples 2 to 4 was inferred to be similar to that of Example 1, and each all-solid-state battery cell of Examples 5 to 7, 9, and 10 was inferred to be similar to that of Example 8.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

121: positive active material layer
122: negative active material layer
123: solid electrolyte layer
124: insulation layer
125: current collector
131, 132: external electrode layer
140: protective layer

The invention claimed is:

1. A solid electrolyte comprising Li, Si, B, Zr, and P, wherein the solid electrolyte is represented by Chemical Formula 1:

$$a(Li_2O)\cdot b(SiO_2)\cdot c(B_2O_3)\cdot d(P_2O_5)\cdot e(ZrO_2) \quad \text{[Chemical Formula 1]}$$

wherein, in Chemical Formula 1, a to e are real numbers representing mole fractions, $40 \leq a \leq 60$, $0 < b \leq 30$, $0 < c \leq 60$, $0 < d \leq 60$, and $0 < e \leq 50$, and the solid electrolyte has a $Li_3PO_4$ crystal phase having a size of greater than or equal to about 3 nm and less than or equal to about 10 nm in an amorphous structure.

2. The solid electrolyte of claim 1, wherein based on 100 mol % of the total amount of Li, Si, B, Zr, and P, in the solid electrolyte, Li is included in an amount of greater than or equal to about 40 mol % and less than or equal to about 80 mol %, Si is included in an amount of greater than about 0 mol % and less than or equal to about 30 mol %, B is included in an amount of greater than about 0 mol % and less than or equal to about 60 mol %, Zr is included in an amount of greater than about 0 mol % and less than or equal to about 50 mol %, and P is included in an amount of greater than about 0 mol % and less than or equal to about 60 mol %.

3. The solid electrolyte of claim 1, wherein a mole fraction of Li/(Si+B+Zr) in the solid electrolyte is about 0.5 to about 5.

4. The solid electrolyte of claim 1, wherein a+b+c+d+e=100.

5. The solid electrolyte of claim 1, wherein a softening point of the solid electrolyte is greater than or equal to about 500° C. and less than or equal to about 550° C.

6. The solid electrolyte of claim 1, wherein the solid electrolyte has an ionic conductivity of greater than or equal to about $1.0\times10^{-7}$ S/cm.

7. An all-solid-state battery, comprising a body including a solid electrolyte layer and a positive electrode layer and a negative electrode layer alternately stacked with the solid electrolyte layer disposed therebetween; and a first external electrode disposed on one side of the body and a second external electrode disposed on another side of the body, wherein the solid electrolyte layer includes the solid electrolyte of claim 1.

8. The all-solid-state battery of claim 7, wherein the positive electrode layer and the negative electrode layer each include a current collecting layer and an electrode active material layer on the current collecting layer;

the current collecting layer and the electrode active material layer each include the solid electrolyte and a carbon-based conductive material; and the electrode active material layer further includes an electrode active material.

* * * * *